March 10, 1964 S. S. GREEN 3,124,720

MODULAR ELECTRONIC ASSEMBLIES WITH COOLING MEANS

Filed July 7, 1961

INVENTOR
SIDNEY S. GREEN
BY Marvin Jacobson
AGENT

United States Patent Office 3,124,720

Patented Mar. 10, 1964

3,124,720

MODULAR ELECTRONIC ASSEMBLIES WITH COOLING MEANS

Sidney S. Green, Minneapolis, Minn., assignor to Sperry Rand Corporation, New York, N.Y., a corporation of Delaware Filed July 7, 1961, Ser. No. 122,493
13 Claims. (Cl. 317—100)

This invention relates to electronic assemblies and in particular to electronic assemblies of the modular type which are interconnected to perform the electronic functions in electronic apparatus.

The modular assembly concept is based on the fact that electronic circuits, even those of a highly complex nature, can be broken up into separate portions comprising electronic components and associated circuitry and these separate portions can be electrically interconnected to achieve the overall electronic circuit.

The number of components and the extent of the associated circuitry combined in a single module is, of course, a matter of choice. Electronic data processing equipment, particularly digital computers, lend themselves to the modular assembly concept, since there are usually a large number of identical circuits which are combined to perform the electronic function of the equipment. For example, digital computers usually include a plurality of registers with all stages of the registers being identical and further include control circuits consisting of a large number of identical circuits. In a typical case a computer may include eight 30-stage registers with each stage being a bistable transistor flip-flop so that a total of at least 240 bistable flip-flops are utilized. By including the components and the associated electrical circuitry of a single bistable flip-flop in an individual modular assembly and by making proper electrical interconnections between a plurality of these modules, complete registers can be fabricated. Of course, it should be recognized that the modular assembly concept is not restricted to modules of identical circuits. In general it is preferable to have as many modules containing identical circuitry as possible so that mass production of modules can be achieved. In order to effect one of the greatest advantages of using the modular assembly concept the modular assemblies are preferably of the pluggable type. The electrical interconnections between modules is via mating electrical connectors so that the modules are detachably coupled to one another. In this manner if a defect occurs in a given module which leads to erroneous operation of a computer it can be remedied by unplugging the defective module and replacing it with an operational one. Additionally, of course, the electronic function can be varied by replacing selected ones of the modules with others of different circuits.

In utilization of pluggable modular assemblies to fabricate electronic apparatus more space is required to contain the same amount of components and associated circuitry. Additionally, there may be added weight and because of the electrical interconnections required longer wire lengths result which may be a serious problem in present day high speed computing devices. To overcome some of these difficulties, the modules are generally made as small and compact as possible and are packed together closely. For various reasons, such as protection from mishandling, protection from dust and environmental conditions, and for maintaining physical stability substantially free from harmful effects of vibration, the electronic components and the associated circuitry in a module are usually enclosed by a container or are encapsulated. Because of the close packing and the enclosing of the components, problems due to increased temperatures in the vicinity of heat-dissipating components arise since the normal circulation path of cooling air is impeded. This invention overcomes the temperature problems encountered by providing cooling means in heat-transfer relationship to the enclosed heat-dissipating components and in addition the cooling means is also utilized to distribute power to the modules and to provide electrical paths to the modules. The latter is achieved in one embodiment by an electrically conductive coolant conveying means mounted in heat-transfer relationship to the heat dissipating components to which the power to be distributed is applied and to which selective electrical connections are made from the enclosed circuitry in the modular assemblies. Alternatively, the coolant itself is an electrical conductor and the power to be distributed is applied thereto and selective electrical connections are made between the enclosed circuitry in the modular assemblies and the coolant. In the former case the coolant is preferably a gas which is conveyed through the modular assembly under pressure through one perforated conveying member and a return path at a lower pressure is provided by another perforated gas-conveying member through the modular assembly. The gas-conveying members are arranged with respect to one another and with respect to the heat-dissipating components enclosed in the modular assembly such that at least part of the cooling gas passes around the heat-dissipating components in going from the higher pressure member to the lower pressure member. In the embodiment wherein the coolant itself is used as the electrically conductive power distributing means, only a single fluid conveying member through the modular assembly is required although it is obvious that if greater cooling is required, a plurality of fluid-conveying members can be utilized.

Therefore, it is an object of this invention to provide a new and improved modular assembly for electronic components and associated circuitry.

Another object of this invention is to provide means for alleviating temperature difficulties that arise in very closely packed electronic circuits containing heat-dissipating elements.

Still another object of this invention is to make more efficient use of the cooling distributing system in electronic circuits by utilizing it to distribute power to the circuits.

These and other more detailed and specific objects will be disclosed in the course of the following specification, reference being had to the accompanying drawings, in which.

Figure 1:
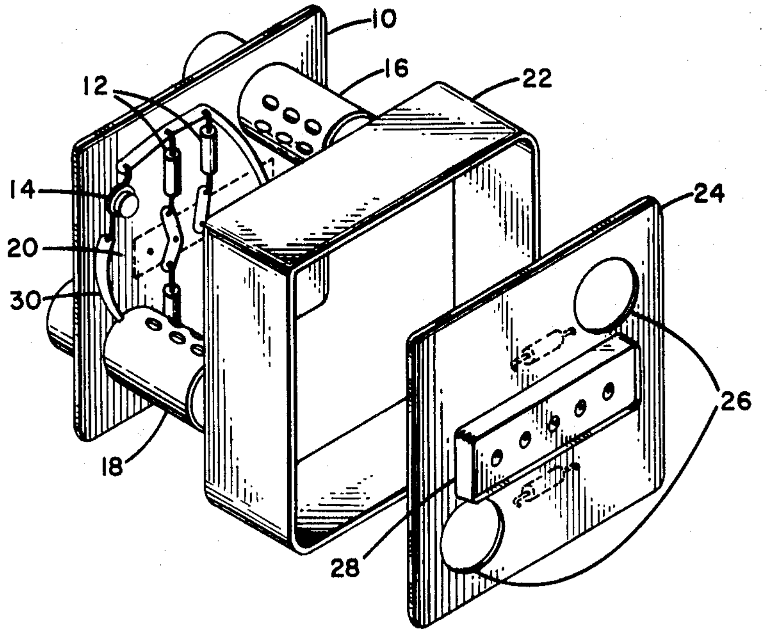
FIG. 1 is a blown apart isometric view of an electronic modular assembly incorporating the features of one embodiment of this invention.

Base plate member 10 is preferably a printed circuit board with a plurality of electronic components, such as resistors 12 and transistor 14, mounted thereon. The associated electrical circuitry, that is the electrical interconnections between the various components contained in the module, is made by the printed wiring contained on the base plate 10. It is understood that the types and quantities of components and the type of interconnecting wiring is shown for exemplary purposes only and no limitation thereto is intended. Mounted through the base plate are a pair of perforated tubular elements 16 and 18. An electrical connector 20 for making external electrical connections to the circuitry on the base plate is mounted on the side of the base plate opposite to that upon which the components are mounted and is indicated by dotted line. For exemplary purposes to be explained subsequently in more detail in regard to FIG. 2, connector 20 can be considered to be a male connector. Enclosing wall member 22 is attached to the base plate 10 along the periphery thereof to enclose the components and associated circuitry. Attached to the other edge of the wall member 22 is cover plate 24 which may have additional components and circuitry mounted thereon which are indicated in the conventional manner. The two tubular members 16 and 18 which are mounted through the base plate 10 are also mounted through the diagonally opposite openings 26 in the cover plate. Electrical connector 28 is mounted on the unenclosed side of the cover plate for making external electrical connections to the enclosed circuit in the modular assembly. Preferably connector 28 is the female type being a mating connector to the male connector 20 on base plate 10.

With the base member 10 and the cover plate 24 each attached to opposite edges of the wall member 22 there is formed a modulator electronic assembly comprising a container enclosing heat-dissipating components and associated circuitry. A cooling gas, such as air, conveyed by one of the tubular members, for example 18, at a given pressure will escape at least in part through the perforations and travel to the lower pressure in perforated tubular member 16. In the course of travel between the tubular coolant conveying members the cooling air passes around the enclosed heat-dissipating components to maintain the temperature at a desired level.

In the embodiment shown in FIG. 1, either of the fluid-conveying tubular members 16 or 18 or both are of an electrically conductive material. By means not shown, one of the members is electrically connected as a ground return path and the other is electrically connected as a means for distributing power in the form of a D.C. voltage which is required by the circuit in the module. For example, if the circuit requires a +15 volt D.C., this would be distributed from the source through fluid-conveying member 18 and selective electrical connection made from the enclosed circuitry to this member, for example as shown by electrical connection 30. Additionally, fluid-conveying member 16 would be electrically grounded so as to provide the return path for currents between the circuits of interconnected modules as well as the ground return path for the +15 volt distributed by fluid-conveying member 18.

Figure 3:
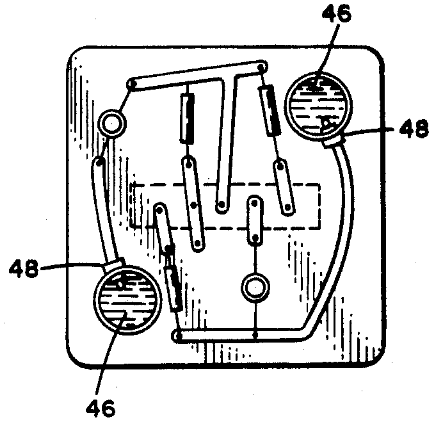
FIG. 3 is another embodiment of this invention showing an electrically conductive fluid for cooling purposes.

Before describing how a plurality of modular assemblies similar to those of FIG. 1 may be interconnected to fabricate a larger assembly of an electrical apparatus, a few of the large number of possible variations from the embodiment described in FIG. 1 will be described. The base plate 10 with the components mounted thereon and the associated electrical circuitry along with the fluid-conveying members 16 and 18 can be encapsulated in some type of material to protect the components and circuitry against dust and other environmental conditions. When using the enclosing encapsulating material in lieu of the wall member 22, the fluid-conveying members would not be perforated and the coolant conveyed by said members can be either a gas or a liquid. Obviously, either a single fluid-conveying member could be utilized which would be mounted in close proximity to the heat-dissipating components mounted on the base plate or a plurality of similarly arranged fluid-conveying members could be utilized. In this type of encapsulated module, preferably a single electrical connector, either male or female, for making external electrical connections to the circuit in the module would be mounted on one edge of the base plate 10 and the wiring interconnections between a plurality of modules of this type would be the electrical wiring between mating connectors. When utilizing a liquid coolant, as shown at 46 in FIG. 3, the coolant itself could serve as the electrical conducting member for providing power distribution or ground returns. Preferably, the liquid-conveying member is constructed of an electrically insulative material; selective electrical connection between the electrically-conductive coolant and the circuitry contained in the module would be made through the fluid-conveying member to the proper portion of the electrical circuitry as shown at 48 in FIG. 3. The combination of the base plate member 10 containing the electrical circuit of the module and wall member 22 enclosing the components and the associated circuitry is another possible variation. This could be used in combination with encapsulating material. In any event, the arrangement and the use of the coolant-conveying members has a large number of possibilities including those described previously in relation to the modular assembly of FIG. 1 and the encapsulated modular assembly. In any of the variations previously described, the quantity and relative placement of the electrical connectors for making external electrical connections to the module circuits is obviously a matter of choice and no limitation is intended by the above description or by the embodiment described in FIG. 1. Obviously, the teachings of this invention, whereby means are provided for bringing a coolant in heat transfer relationship to heat-dissipating electronic components which are packaged such that normal air circulation is impeded, and further providing that the cooling means also serves as a means for electrical power distribution, can be utilized in a large variety of ways within the scope of the teachings of this invention.

Figure 2:
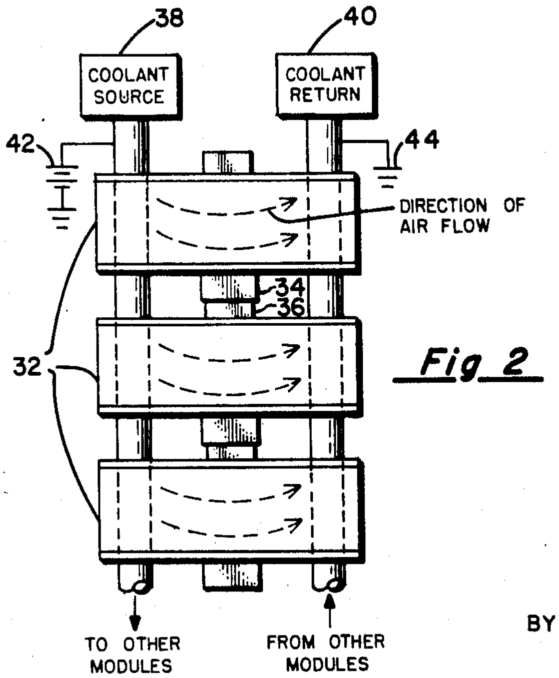
FIG. 2 is another embodiment of this invention showing the interconnection of a plurality of modular assemblies.

FIG. 2 shows a combination of the modular assemblies of FIG. 1 intercoupled in a typical manner to form a portion of an electrical apparatus. Each of the rectangular boxes 32 represents a modular assembly of FIG. 1 which are electrically interconnected by the mating of corresponding male and female electrical connectors such as 34 and 36. The mating of the external electrical connectors besides providing the electrical interconnections between modules orients the modules such that the respective fluid-conveying members in each module, such as 16 and 18 in FIG. 1, are properly aligned between modules so as to form a continuous fluid-conveying member through the series of interconnected modules. A coolant source 38 to provide a cooling fluid such as air at a given pressure is coupled to one of the fluid-conveying members and coolant return 40 is coupled to the other fluid-conveying member to provide the return path for the coolant. Potential source 42, shown as a D.C. voltage source, is electrically connected to the coolant-conveying member which is coupled to the coolant source and in this manner the fluid-conveying member distributes the energy from said potential source throughout all of the interconnected modules. The other fluid-conveying member is electrically grounded, indicated in the conventional manner as item 44, to provide the ground return paths required either by the D.C. energy source 42 or signal return paths or both for the interconnected modules. Coolant source 38 can be any well-known means for providing a cooling gas, such as air, to the fluid-conveying members under pressure. As the cooling air travels through the conveying members which are mounted through the modular assemblies, part of the air escapes through the perforations of the fluid-conveying members enclosed in the modular assembly and passes around the heat-dissipating components to the lower pressure fluid-conveying member in a direction indicated by the dotted-line arrows within each of the modular assemblies. In this manner the heat generated by the enclosed heat-dissipating components is conveyed away from the area immediately surrounding the heat-dissipating components so as to maintain the temperature at a proper level. As previously stated, the electrical interconnections between the various modules are made via the respective pluggable male and female electrical connectors attached to the base and cover plates of the module. In this manner the modules are detachably intercoupled so that if it is necessary to remove a module for maintenance purposes or to effect a change in the electrical circuit, this can be easily done by unplugging the module or modules desired to be removed and replacing them with other modules.

It should be understood, of course, that the interconnection of the modular assemblies shown in FIG. 2 is only intended to show one embodiment utilizing the module described in FIG. 1. Since, as previously described, the teachings of this invention provide a large number of possible arrangements in the modular assembly, the interconnection in the assembly of an electrical apparatus is likewise capable of being effected in a large number of ways. For example, if an encapsulated module, as described above, is utilized with only a single electrical connector for providing external electrical connections to the module circuit, each of the modules would have a corresponding electrical connector with which the module connector would be mated and the electrical interconnections between the various modules would be by wiring between these external connectors. The encapsulated modules would be plugged into their corresponding mating connectors in a manner such that the fluid-conveying members of all of the modules would be properly aligned so as to provide a continuous fluid-conveyor throughout the electrical apparatus. In this way again, the mating electrical connector would provide both the proper electrical interconnections and would orient the modular assemblies properly so as to provide the proper alignment between the fluid-conveying members of each of the modular assemblies. Again the modules would be of the pluggable type so that they are easily removed for maintenance purposes or for modifying the electrical circuitry.

It is understood that suitable modifications may be made in the structure as disclosed provided such modifications come within the spirit and scope of the appended claims. Having now, therefore, fully illustrated and described my invention, what I claim to be new and desire to protect by Letters Patent is:

1. A modular assembly for electronic circuits, comprising: a base plate member of electrically insulative material for mounting heat-dissipating electrical components and associated electrical circuitry; a wall member attached to said base plate member encompassing said components; a fluid-transporting member constructed of electrically conductive material mounted through said base plate independent of said wall member and coupled in heat transfer relationship to said components; and means for electrically connecting said fluid-transporting member to said electrical circuitry.

2. In an assembly of heat-dissipating electrical components and associated electrical circuitry enclosed in a manner such that normal circulation of air around said components is impeded: a pair of perforated tubular members; means for forcing a cooling fluid through one of said pair of tubular members under pressure; means for withdrawing fluid from said other tubular member at a lower pressure; said tubular members arranged with respect to each other and said components such that at least part of said cooling fluid travels from the perforations in said higher pressure tubular member around said components to said lower pressure tubular member.

3. An assembly as in claim 2 wherein said cooling fluid is a gas.

4. An assembly as in claim 3 wherein said tubular elements are of an electrically conductive material and further including means for electrically connecting said tubular members to the electrical circuitry.

5. A modular assembly of electronic circuits comprising: a container including a base plate and a cover plate with an enclosing attached wall member, said base and cover plates containing electrical circuitry; a plurality of heat-dissipating electrical components mounted on said base and cover plates in the enclosed space therebetween; a first perforated tubular member of an electrically conductive material for transporting a cooling fluid at a pressure above atmospheric mounted through said base and cover plates; a perforated tubular member of electrically conductive material for transporting cooling fluid at a pressure less than that of said first tubular member mounted through said base and cover plates; said tubular members mounted with respect to one another such that at least part of said cooling fluid flows around said components in traveling from said higher pressure to said lower pressure in said container; and means for electrically connecting said tubular elements to said electrical circuitry.

6. An assembly as in claim 5 further including means attached to both of said plates for making external electrical connections to said electrical circuitry.

7. In an assembly of heat-dissipating electrical components and associated electrical circuitry enclosed in a manner such that normal circulation of air past said components is impeded: a cooling liquid of an electrically conductive material; means for transporting said liquid in heat-transfer relationship to enclosed heat-dissipating electrical components but not in physical contact therewith; and means for electrically selectively connecting said liquid to the associated electrical circuitry.

8. An assembly for electronic circuits, comprising: a container including a base plate and a cover plate with an enclosing attached wall member; a plurality of heat-dissipating electrical components and associated electrical circuitry mounted on said base and cover plates in the enclosed space therebetween; a liquid coolant of an electrically conductive material; means mounted through said container for transporting said liquid in heat-transfer relationship to said components but not in physical contact therewith; and means for electrically connecting said liquid to said electrical circuitry.

9. An assembly as in claim 8 wherein said liquid transporting means is mounted through said base and cover plates and further including a female electrical connector secured to one of said plates and a male electrical connector mounted to the other of said plates for making external electrical connections to said enclosed electrical circuitry.

10. Electrical apparatus, comprising: a plurality of modular assemblies each comprising a base plate constructed of electrically insulative material, a cover plate constructed of electrically insulative material and an enclosing wall member, a plurality of heat-dissipating electrical components and associated electrical circuitry mounted on said base and cover plates in the enclosed space therebetween, a female electrical connector fixedly secured to one of said plates and a male electrical connector fixedly secured to the other of said plates, each of said connectors electrically connected to the electrical circuitry on the respective plates, electrically conductive means independent of said wall member for conveying cooling fluid mounted through said base and cover plates in heat-transfer relationship to said enclosed components, and means for electrically connecting said enclosed circuitry to said fluid conveying means; said modular assemblies detachably intercoupled by the mating of respective male and female electrical connectors such that said respective fluid conveying means are aligned and coupled to form a contiguous fluid conveying means and electrical conduction path.

11. A modular assembly for electric circuits, comprising; a base plate member of electrically insulative material for mounting heat dissipating electrical components and associated electrical circuitry; a wall member attached to said base plate member encompassing said components; electrically conductive cooling means independent of said wall member passing through said base plate and coupled in heat transfer relationship to said components; and means for electrically connecting said cooling means to said electrical circuitry.

12. Electrical apparatus, comprising; a plurality of modular assemblies, each comprising a base plate constructed of electrically insulative material, a cover plate constructed of electrically insulative material, an enclosing wall member, a plurality of heat dissipating electrical components and associated electrical circuitry mounted on said base and cover plates in the enclosed space therebetween, a female electrical connector fixedly secured to one of said plates and a male electrical connector fixedly secured to the other of said plates, each of said connectors electrically connected to the electrical circuitry on the respective plates, liquid-conveying means independent of said wall member mounted through said base and cover plates in heat transfer relationship to said enclosed components, said conveying means containing a cooling liquid of electrically conductive material, and means for electrically connecting the liquid to the electrical circuitry; said modular assemblies detachably intercoupled by the mating of respective male and female electrical connectors such that the respective liquid-conveying means are aligned and coupled to form a contiguous liquid-conveying means and electrical conduction path.

13. Electrical apparatus, comprising; a plurality of modular assemblies, each comprising heat dissipating electrical components and associated electrical circuitry enclosed in a manner such that normal circulation of air around said components is impeded, a female and a male electrical connector fixedly secured to the modular assembly, each of said conductors electrically connected to said electrical circuitry, a pair of perforated tubular members constructed of an electrically conductive material passing through said modular assembly and arranged with respect to each other and said components such that fluid passing through the perforations passes around said components, and means for electrically connecting said enclosed circuitry to said tubular members; said modular assemblies detachably inter-coupled by the mating of respective male and female electrical connectors such that said tubular members are aligned and coupled to form contiguous tubular members and electrical conduction paths; and means for forcing a cooling gas through one of the contiguous tubular members under pressure while withdrawing gas from the other contiguous tubular member at a lower pressure.

References Cited in the file of this patent

UNITED STATES PATENTS

| | | |
|---|---|---|
| 2,815,472 | Jackson et al. | Dec. 3, 1957 |
| 2,942,856 | Woodward et al. | June 28, 1960 |